3,516,996
1-ALKYLTHIAZOLO[2,3-c][1,2,4]BENZO-
THIADIAZINE-2-CARBOXYLIC ACID,
5,5-DIOXIDE ESTERS
Peter H. L. Wei, Upper Darby, and Stanley C. Bell, Penn Valley, Pa., assignors to American Home Products Corporation, New York, N.Y., a corporation of Delaware
No Drawing. Continuation-in-part of application Ser. No. 681,902, Nov. 9, 1967. This application Feb. 12, 1968, Ser. No. 704,505
Int. Cl. C07d 93/32
U.S. Cl. 260—243
5 Claims

ABSTRACT OF THE DISCLOSURE

This invention is concerned with 1-alkylthiazolo[2,3-c][1,2,4]benzothiadiazine-2-carboxylic acid, 5,5-dioxide esters which are pharmacologically active as antidiarrheal agents.

---

This application is a continuation-in-part of U.S. Pat. application, Ser. No. 681,902, filed on Nov. 9, 1967 by Peter H. L. Wei and Stanley C. Bell also entitled "1-Alkylthiazolo[2,3-c][1,2,4]Benzothiadiazine-2-Carboxylic Acid, 5,5-Dioxide Esters," and now abandoned.

This invention relates to new and novel nitrogen and sulfur containing tricyclic compounds. In particular, it is concerned with 1-alkylthiazolo[2,3-c][1,2,4]benzothiadiazine-2-carboxylic acid, 5,5-dioxide esters which have antidiarrheal properties when tested under standard and acceptable pharmacological procedures.

The new and novel compounds of the present invention are exemplified by the following structural formula:

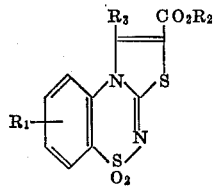

wherein $R_1$ is selected from the group consisting of hydrogen, halogen, lower alkyl and lower alkoxy; and $R_2$ and $R_3$ are lower alkyl. The terms "lower alkyl" and "lower alkoxy" as employed herein are meant to include both branched and straight chain moieties having from one to about eight carbon atoms. Typical examples of these compounds are: 8-chloro-1-methylthiazolo[2,3-c][1,2,4]benzothiadiazine-2-carboxylic acid, 5,5-dioxide ethyl ester; 1,7-dimethylthiazolo[2,3-c][1,2,4]benzothiadiazine-2-carboxylic acid, 5,5-dioxide ethyl ester; and 8-methoxy-1-methylthiazolo[2,3-c][1,2,4]benzothiadiazine-2-carboxylic acid, 5,5-dioxide ethyl ester.

The new and novel compounds of the present invention are prepared by the process which is illustrated by the following reaction:

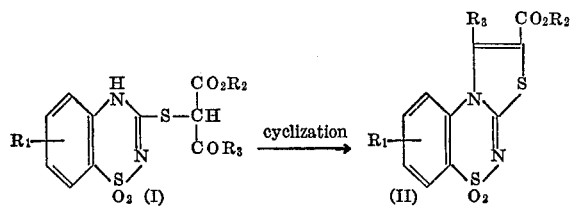

wherein $R_1$, $R_2$ and $R_3$ are defined as above. The cyclization reaction is affected by contacting an appropriate 2-(1,1-dioxo-2H-1,2,4-benzothiadiazin-3-ylthio)acylacetic acid ester (I) with a carboxylic acid anhydride, e.g. acetic anhydride, in the presence of pyridine, at about reflux temperatures for a period of about one to about five hours.

When the cyclization reaction is complete, the resulting 1-alkylthiazolo[2,3-c][1,2,4]benzothiadiazine-2-carboxylic acid, 5,5-dioxide ester (II) is separated by conventional procedures. For example, the reaction mixture is concentrated to dryness, the residue treated with ether and then recrystallized from a suitable solvent, e.g. an alkanol. The 2-(1,1-dioxo-2H-1,2,4-benzothiadiazin-3-ylthio)acylacetic acid esters (I) employed as starting compounds in the above reaction are prepared and described in copending U.S. Pat. application, Ser. No. 681,884, entitled "2-(1,1-Dioxo-2H-1,2,4-Benzothiadiazin-3-ylthio) Acylacetic Acid Esters and Related Compounds" which was filed in the U.S. Patent Office on the same day as the subject application.

The new and novel 1-alkylthiazolo[2,3-c][1,2,4]benzothiadiazine-2-carboxylic acid, 5,5-dioxide esters of the present invention possess valuable pharmacological activity. In particular, these compounds in standard pharmacological procedures demonstrate antidiarrheal activity and are useful as antidiarrheals. Because of this property, they are of importance in experimental and comparative pharmacology.

In the pharmacological evaluation of the antidiarrheal compounds of this invention, the in vivo effects of these compounds are tested by the procedure described by Leslie and Maxwell in Nature 202:97 (1964). This procedure is hereinafter set forth.

Test compounds, at a number of dose levels, are orally administered to groups of six mice (three males and three females) at each dose level. One hour later the animals are challenged with oxytremorine 0.4 mg./kilo, which is intraperitoneally administered. The animals are graded at ten and twenty minutes for diarrhea, among other physiological properties. Protection against there diarrheal symptoms is determined by a comparison with controls which are simultaneously run. Percent antagonism at each time interval is calculated as follows:

Percent antagonism $$= \frac{\text{ave. score (control)} - \text{ave. score (test)}}{\text{ave. score (control)}} \times 100$$

The $ED_{50}$ values of the tested compounds are then calculated on probit-log dose paper.

The 1-alkylthiazolo[2,3-c][1,2,4]benzothiadiazine-2-carboxylic acid, 5,5-dioxide esters of this invention in the above test procedure antagonized the diarrheal effects of oxytremorine for twenty minutes and have a calculated $ED_{50}$ of 30 to 50 mg./kilo.

When the compounds of this invention are employed as antidiarrheal agents they may be administered alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present antidiarrheal agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

2 - (6 - chloro - 1,1-dioxo-2H-1,2,4-benzothiadiazin-3-ylthio)acetoacetic acid, ethyl ester (5.0 g.) is suspended in 50 ml. of acetic anhydride containing 2 ml. of pyridine and the mixture is heated to reflux for four hours. Thereafter, the solvent is removed, the residue is treated with ether and collected. The crude product is recrystallized from ethanol to yield 8 - chloro-1-methylthiazolo[2,3-c][1,2,4]benzothiadiazine - 2 - carboxylic acid, 5,5-dioxide ethyl ester.

*Analysis.*—Calcd. for $C_{13}H_{11}ClN_2O_4S_2$ (percent): C, 43.51; H, 3.08; Cl, 9.88; N, 7.81; S, 17.87. Found (percent): C, 43.47; H, 3.24; Cl, 9.9; N, 7.93; S, 18.2.

Similarly, 2 - (7 - bromo-1,1-dioxo-2H-1,2,4-benzothiadiazin-3-ylthio)acetoacetic acid, methyl ester and 2-(6-fluoro - 1,1 - dioxo-2H-1,2,4-benzothiadiazin-3-ylthio)propioacetic acid, methyl ester are respectively converted to their corresponding 7-bromo-1-methylthiazolo[2,3-c][1,2,4]benzothiadiazin - 2-carboxylic acid, 5,5-dioxide methyl ester and 1-ethyl - 8 - fluorothiazolo[2,2-c][1,2,4]benzothiadiazine-2-carboxylic acid, 5,5-dioxide methyl ester.

EXAMPLE II

2 - (7 - methyl - 1,1 - dioxo - 2H - 1,2,4 - benzothiadiazin-3-ylthio) acetoacetic acid ethyl ester (15.0 g.) is suspended in 150 ml. of acetic anhydride containing 6 ml. of pyridine and the mixture is heated to reflux for five hours. Thereafter, the solvent is removed, the residue is treated with ether and collected. The crude product is recrystallized from methanol to afford 1,7-dimethylthiazolo[2,3-c][1,2,4]benzothiadiazine-2-carboxylic acid, 5,5-dioxide ethyl ester.

In like manner, 1,6-dipropylthiazolo[2,3-c][1,2,4] benzothiadiazine - 2 - carboxylic acid, 5,5-dioxide methyl ester and 7 - ethyl-1-methylthiazolo[2,3-c][1,2,4-]benzothiadiazine-2-carboxylic acid, 5,5-dioxide butyl ester are synthesized.

EXAMPLE III

2 - (6 - methoxy-1,1 - dioxo - 2H - 1,2,4 - benzothiadiazin-3-ylthio) acetoacetic acid ethyl ester (10.0 g.) is suspended in 100 ml. of acetic anhydride containing 2 ml. of pyridine and the mixture is heated to reflux for one hour. Thereafter, the solvent is removed, the residue is treated with ether and collected. The crude product is recrystallized from isopropanol to yield 8-methoxy-1-methylthiazolo[2,3-c][1,2,4]benzothiadiazine - 2 - carboxylic acid, 5,5-dioxide ethyl ester.

In the same way, 2-(6-ethoxy-1,1-dioxo-2H-1,2,4-benzothiadiazin - 3-ylthio)propioacetic acid, butyl ester is converted to 8-ethoxy-1-ethylthiazolo[2,3-c][1,2,4]benzothiadiazine-2-carboxylic acid, 5,5-dioxide butyl ester and 2-(1, 1 - dioxo-8-propoxy-2H-1,2,4-benzothiadiazin-3-ylthio)butyroacetic acid, methyl ester is converted to p-propoxy-1-propylthiazolo[2,3-c][1,2,4]benzothiadiazine-2-carboxylic acid, 5,5-dioxide methyl ester.

EXAMPLE IV

2 - 1,1 - dioxo-2H-1,2,4-benzothiadiazin-3-ylthio) acetoacetic acid ethyl ester (5.0 g.) is suspended in 50 ml. of acetic anhydride containing 2 ml. of pyridine and the mixture is heated to reflux for four hours. Thereafter, the solvent is removed, the residue is treated with ether and collected. The crude product is recrystallized from ethanol to afford 1-methylthiazolo[2,3-c][1,2,4-]benzothiadiazine-2-carboxylic acid, 5,5-dioxide ethyl ester.

What is claimed is:

1. A compound selected from the group consisting of those having the formula:

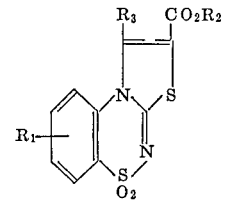

wherein $R_1$ is selected from the group consisting of hydrogen, halogen, lower alkyl and lower alkoxy; and $R_2$ and $R_3$ are lower alkyl.

2. A compound as described in claim 1 which is: 8-chloro - 1-mehtylthiazolo[2,3-c][1,2,4]benzotihadiazine-2-carboxylic acid, 5,5-dioxide ethyl ester.

3. A compound as described in claim 1 which is 1,7-dimethylthiazolo[2,3-c][1,2,4]benzothiadiazine - 2 -carboxylic acid, 5,5-dioxide ethyl ester.

4. A compound as described in claim 1 which is: 8-methoxy-1-methylthiazolo[2,3-c][1,2,4]benzothiadiazine-2-carboxylic acid, 5,5-dioxide ethyl ester.

5. A compound as described in claim 1 which is: 1-methylthiazolo[2,3-c][1,2,4]benzothiadiazine-2-carboxylic acid, 5,5-dioxide ethyl ester.

References Cited

UNITED STATES PATENTS 3,311,620   3/1967   Bell et al. _____ 260—243

NICHOLAS S. RIZZO, Primary Examiner

U.S. Cl. X.R.

424—246